United States Patent [19]

Pederson

[11] Patent Number: 5,056,856
[45] Date of Patent: Oct. 15, 1991

[54] PROTECTIVE COVERING ATTACHMENT FOR CARGO HOLDS HAVING A FIFTH-WHEEL TRAILERING DEVICE

[76] Inventor: Merle L. Pederson, 1309 S. 4th, La Crosse, Wis. 54601

[21] Appl. No.: 648,160

[22] Filed: Jan. 30, 1991

[51] Int. Cl.$^5$ .............................................. B60P 7/04
[52] U.S. Cl. ................................ 296/100; 296/24.1; 280/423.1
[58] Field of Search ................ 296/100; 280/423.1, 280/901

[56] References Cited

U.S. PATENT DOCUMENTS

| | | | |
|---|---|---|---|
| 3,936,077 | 2/1976 | Bliek | 280/423.1 |
| 4,216,990 | 8/1980 | Musgrove et al. | 296/100 |
| 4,542,911 | 9/1985 | Mulligan | 296/100 |
| 4,832,359 | 5/1989 | Rafi-Zadeh | 280/423.1 |

Primary Examiner—Robert R. Song
Attorney, Agent, or Firm—M. Paul Hendrickson

[57] ABSTRACT

There is disclosed a protective covering attachment for pick-up trucks equipped with fifth-wheel tows. The attachment includes an undercarriage having a slotted portion which affords direct accessing of fifth-wheel hitching posts onto the hitching mount. Removable panel sections which mate onto the undercarriage about the slotted portion provide a protective cover while also permitting the appropriate panel sections to be removed for accessing onto the mount and then reassembled onto the undercarriage during the fifth-wheel tow. Partitioning the attachment into hinged segments permits accessing to the cargo hold without necessitating any detachment of panel sections from the undercarriage.

14 Claims, 4 Drawing Sheets

PROTECTIVE COVERING ATTACHMENT FOR CARGO HOLDS HAVING A FIFTH-WHEEL TRAILERING DEVICE

FIELD OF THE INVENTION

The present invention relates to protective coverings for vehicular cargo holds, and more particularly to a protective covering attachment for cargo holds of vehicles equipped with fifth-wheel trailer systems for trailering fifth-wheel trailers therewith.

BACKGROUND OF THE INVENTION

Fifth-wheel trailers are conventionally trailered by vehicles such as pick-up trucks. Such pick-up trucks customarily have a cargo bed equipped with bed walls and a tailgate for the loading and unloading of cargo therefrom. The fifth-wheel mounting hitch is typically centrally located at a mounting site within the pick-up truck cargo bed between the fenderwells. The fifth-wheel trailer customarily includes a goose neck extension having an upwardly and outwardly support frame terminated by a vertical downwardly disposed hitching post fitted with a king pin for engaging and locking onto a correspondly mating king pin mount within the cargo bed.

The hitching mount within the cargo bed customarily comprises a beveled and slotted locking member which channels the king pin upwardly and inwardly towards a centrally disposed king pin locking member of the hitching mount. During the trailering, the fifth-wheel mounting site is customarily positioned at a lower level or height than the tailgate top rail. It is customary to lower or remove the end gate before hitching onto the fifth-wheel trailer. To hitch the fifth-wheel trailer onto the hitching mount, the vehicle's hitching mount is normally aligned and backed onto the fifth-wheel trailer king pin until it engages and locks onto the hitching mount.

Notwithstanding extensive fifth-wheel trailer usage for several decades, relatively little progress has been made towards the development of an enclosing protective bed cover which may be effectively used therewith. Fifth-wheel trailer hitching mounts customarily occupy a substantial portion of the cargo bed, and especially within the bed area between the rear tire fenderwells of the pick-up bed. The cargo bed is customarily left open and exposed to the elements. The goose-necked trailer and pick-up cab combination tend to create wind currents about the bed which tend to sweep the cargo (especially lighter cargo) from the cargo bed. Other climatic adversities such as hail, rain, snow, sleet, icing, etc. compound those problems associated with the transporting of cargo in vehicles equipped with fifth-wheel trailers. The cargo bed utility is accordingly substantially diminished. Lowering or removal of the tailgate has often practiced during trailering since a raised tailgate section creates substantial wind drag and a concomitant loss in fuel economy. Perforated or apertured tailgate sections are commonly used to partially alleviate this problem.

The mounting and removing fifth-wheel hitching mounts from the cargo beds are strenuous and time consuming. Many fifth-wheel users are retirees, senior citizens and distant travelers. For health and other reasons such users are often physically unable or do not care to remove the mount from the bed and when traveling, users typically unhitch the trailer for want of a suitable storing place or other reasons without removing the mount therefrom.

The design and construction of fifth-wheel trailer assemblies has presented unique problems which heretofore have prevented the adaptation of an effective protective cargo bed top covering thereto. The conventional practice of covering pick-up beds with snap-on tarpaulin, nylon coverings, camper tops, etc. have generally been found to be unsuited for this purpose. The patent literature also fails to disclose covering devices which are compatible with bed mounted fifth-wheel trailer assemblies. U.S. Pat. No. 4,542,911 by Mulligan discloses a camper top which when collapsed onto the box forms a cargo bed covering. U.S. Pat. No. 3,768,858 by Boismeier discloses a bed cover comprised of two pairs of hinged longitudinal panel sections foldable into various configurations including an open position and an enclosed position to cover a bed box.

U.S. Pat. No. 3,936,077 by Blick discloses a tonneau cover for use with a fifth-wheel camper truck. The cover includes an undercarriage frame secured onto the top rails of the truck box sidewalls which supports a flexible cover. The flexible cover is provided with a goose-neck post port opening and an attachable port cover for covering the opening when not trailering the fifth-wheel trailer. The Blick flexible cover is secured to the undercarriage frame by snap fasteners. The flexible cover also includes a zippered elongated slit extending from one of the sides of the cover to the port opening which permits it to be installed or removed from the undercarriage frame. In the Blick tonneau covering device, it is necessary to partially disassemble in part, and reassemble the undercarriage frame in order to mount or dismount the fifth-wheel trailer from the cargo bed. Similarly, the flexible covering necessitates separate disassembling and reassembling onto the undercarriage frame when mounting or dismounting a fifth-wheel trailer therefrom. Enclosure of the bed is accomplished by emplacing the unzipped flexible covering (with the detachable fifth-wheel access opening removed therefrom) about the fifth-wheel king pin post, snapping it onto the undercarriage and zipping it together so as to provide a flexible covering enclosure therefore. The Blick covering device accordingly necessitates several sequential assemblies or disassemblies in the mounting or dismounting of a fifth-wheel trailer to the cargo bed.

SUMMARY OF THE INVENTION

There exists a need for a more effective cargo bed covering attachment for use in combination with fifth-wheel trailering devices. A attachment which would afford a more expeditious hook-up and access to the hitching mount and an improved protective covering for the cargo bed (with or without the fifth-wheel trailer) would fulfill a long felt need. There also exists a need for a substantially more rigid and durable protective covering to effectively combat the harsh environmental conditions inherently encountered during the trailering of a fifth-wheeler. A significant improvement would be achieved if the protective top cover were comprised of a plurality of detachable panel sections which upon selective removal would afford a slotted ingress and egress for a fifth-wheel trailer king pin hitching and unhitching and could thereafter be expeditiously reinserted to provide the desired protective covering therefore.

The present invention provides a protective covering attachment for cargo beds equipped with fifth-wheel hitch assemblies which enables the user to more expeditiously hook and unhook fifth-wheel trailers without necessitating separate disassembly of an undercarriage structure from the protective cover. The attachment herein also substantially reduces wind drag and significantly enhances cargo protection. The cargo bed covering attachment comprises a plurality of removable rigid panel sections and a plurality of undercarriage units which in cooperative association with the cargo bed, the panel sections and the fifth-wheel hitch mount forms a supportive base to provide a protective covering device that substantially retains its structural shape and form during the transit of fifth-wheel trailers therewith. The protective top covering attachment includes a fifth-wheel hitch post panel section and a fifth-wheel hitch post access entryway panel section, both of which may be easily and separately detached or attached to the attachment. The undercarriage is partitioned so that those units bordering onto the hitch post panel section and the entryway panel (upon the removal of these sections) form a channelled entryway for the hitching post. The protective covering device alleviates the hazardous manual stresses and time consuming efforts as typically associated with existing fifth-wheel covering devices. Further embodiments allow for accessing to segmented portions of the cargo hold and the protective compartmentalization thereof.

DETAILED DESCRIPTION AND PREFERRED EMBODIMENTS OF THE INVENTION

Figure 1:
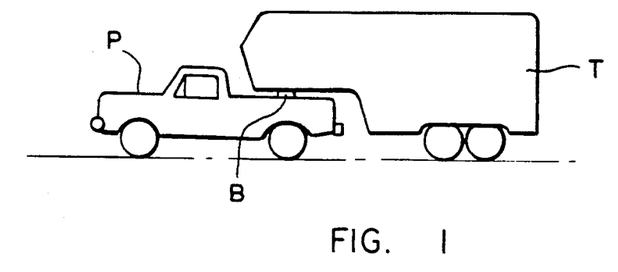
FIG. 1 is a side view of the covering attachment of this invention mounted upon a pick-up truck cargo bed with a fifth-wheel trailer in tow.

The present invention provides a protective covering attachment (generally designated as 1) for use in protecting the cargo holds C of vehicles P (such as the depicted pick-up truck) equipped with a fifth-wheel trailer transport system mounted therewithin. As may be observed from FIG. 1, the attachment 1 does not substantially alter the over-all profile of the towing vehicle P.

Figure 7:
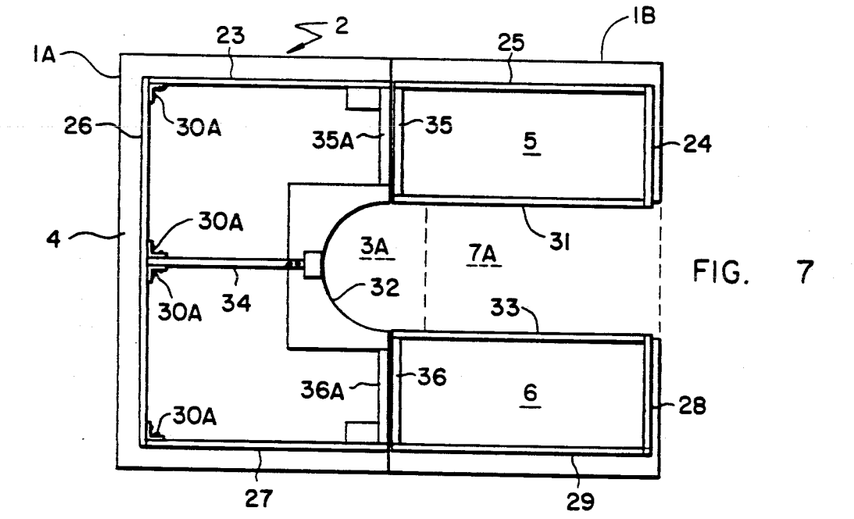
FIG. 7 is an underside view of the attachment shown in FIG. 2.

By referring to the Figures, the present invention provides a cargo bed attachment (generally referenced as 1) for use in covering a cargo hold (generally designated as C) of a transporting vehicle (P) equipped with a cargo bed (G) having vertically extending sidewalls (D, E and F) and an end gate (H) for accessing onto said cargo hold (C), and a fifth-wheel hitching mount A for hitching a fifth-wheel hitching post B thereto, said attachment 1 comprising:

A) a plurality of adjacently positioned and segmented covering panels (designated as 3, 4, 5, 6 and 7) of a size and arrangement so as to form a protective cover (generally identified as 2) for said cargo hold C and to peripherally overlap onto said sidewalls (D, E and F) and said end gate H, with said panels including:

i) a removable port panel section 3 which protectively covers a ported aperture (ported portion abounded within broken line 3A of FIG. 7) of a sufficient size about the hitching mount A to permit the maneuverability of the hitching post B therewithin while trailering a fifth-wheel trailer (T) therewith, and ii) a removable rearward panel section 7 for protectively covering a slotted aperture 7A (e.g. see FIG. 7) which extends from said ported aperture 3A to said end gate H, with said removable rearward section 7 upon its removal therefrom allowing the hitching post B to pass through said slotted aperture 7A;

B) an undercarriage frame (generally designated as 20 in FIG. 8) which supportively engages onto said panels 3–7 and provides detachable mounting sites for securing said panels 3–7 together in an abutting relationship upon said frame 20, with said frame 20 comprising:

i) an external framework (described in greater detail later) of a peripheral configuration bordering onto said sidewalls (D, E and F) and said end gate (H), and said ported aperture 3A and said slotted aperture 7A so as to provide sufficient clearance for hitching post A to pass therewithin, and ii) internal framing chords (described in greater detail later) which interconnectively bridge segmented regions within said external framework so as to provide internal mounting sites for mounting said panels (3–7) thereto;

C) securing means (shown as 40a, 40b, 40c, 40d and 40e in FIG. 3) for attaching and detaching the panels 3 and 7 from the undercarriage frame so as to permit the port panel section 3 and the removable rearward panel section 7 to be separately attached and detached therefrom; and D) anchoring means (described in greater detail later) for anchoring the attachment 1 onto the cargo hold C.

Figure 3:
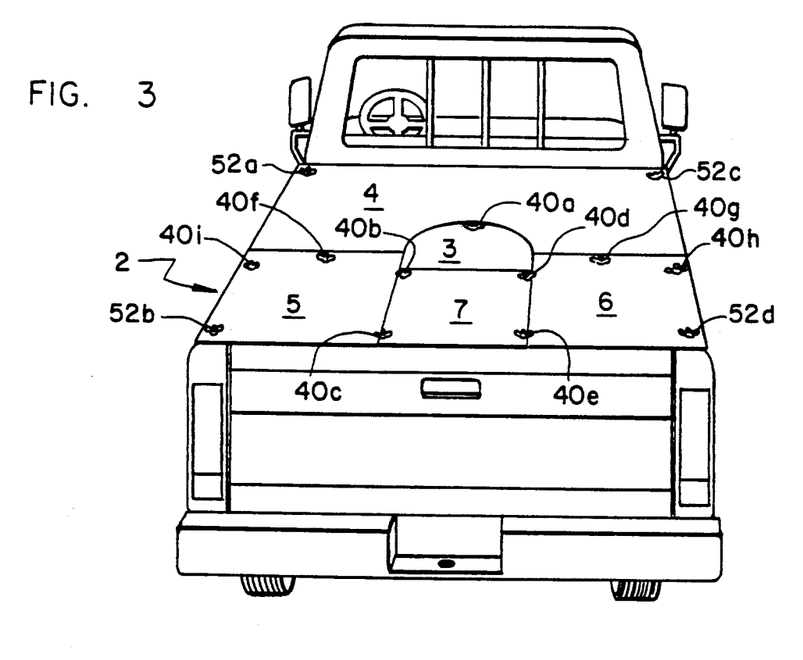
FIG. 3 is a rear elevational view of covering attachment which shows all of the panel covering sections secured thereto to protectively cover the cargo hold.
Figure 4:
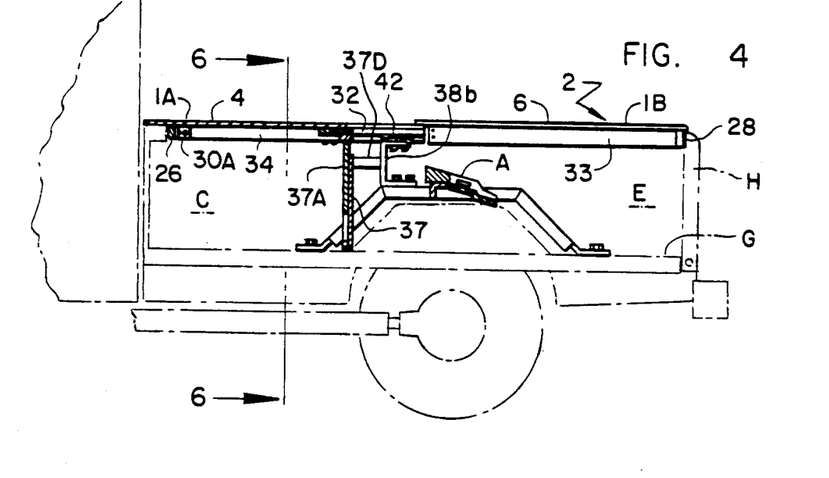
FIG. 4 is a cross-sectional view of the attachment shown in FIG. 2 taken along line 4—4.

With particular reference to the rear elevational views of FIGS. 3 and 4, the protective top cover 2 includes a plurality of easily attachable and detachable panel sections 3, 4, 5, 6 and 7 which may be selectively detached or attached thereto. This feature may be used to particular advantage in affording access for the hitching and unhitching of the fifth-wheel post hitch pin B from mount A. The detachable sections may be readily reassembled together so as to provide a protective cover 2 for the cargo hold C for the fifth-wheel towing.

The illustrated panel sections include a front top cover panel section 4 which protectively covers the forward portion of the cargo hold C, a left rear side panel section 5 in which the forwardmost portions thereof abut onto the front section 4, an access port panel section 3, a right rear panel side section 6 which abuttingly engages onto the front panel section 4 and the access port panel 3 and which is laterally disposed onto the opposite cargo hold c side from the left panel section 5, and a centrally disposed rear enclosure access panel section 7 which abuttingly bridges between the right rear panel section 6 and the left rear panel section 5 as well as onto the post access panel section 3 in the fully assembled attachment as depicted in FIG. 3.

The combination of the front 4, left 5, right 6, and rear 7 panel sections without port panel section 3 being attached thereto affords an effective cargo hold C enclosure while also providing sufficient clearance to permit the trailering of a fifth-wheeler T therewithin. Upon removal, the port panel section 3 provides a hitching post aperture 3A (i.e. open and uncovered area as depicted within the broken line region shown in FIG. 7) of sufficient size and clearance so as to permit the fifth-wheel hitching post B to pivotally maneuver, during transport, about the fifth-wheel hitch pin mount A.

Figure 2:
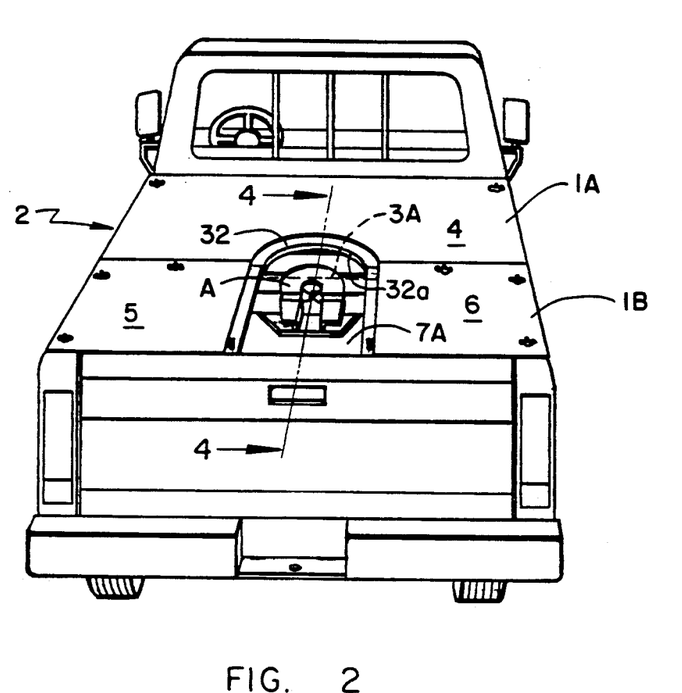
FIG. 2 is a rear elevational view of the attachment mounted to the cargo bed showing two panel sections removed therefrom so as to provide an accessing entryway for the hitching and unhitching of fifth-wheel trailer.

In FIG. 2, the hitching port access covering section 3 and the centrally disposed rear enclosure section 7 are shown as being removed from the protective top covering 2 so as to collectively provide a slotted passageway (illustrated as a combination of 7A and 3A in FIG. 7) of sufficient clearance to permit the vehicular mounted hitching post mount A to be directly backed onto the hitching post B pin (when the tailgate G is lowered) and mounted thereto without necessitating any additional disassemble of the remaining panel sections (i.e. 4–6) or other undercarriage components 20 therefrom. After the hitching post B has been securely latched onto the hitching mount A, the centrally disposed rear enclosure 7 may then be conveniently reinserted and secured onto the supportive undercarriage structure 20. The rearward margin of post panel section 3 may, if desired, be fitted with a metal strip lip 3B (e.g. see FIG. 8) so as to slip beneath and seal against the forward margin of the access entryway panel section 7.

When the fifth-wheel operator subsequently desires to unhitch the fifth-wheel trailer T therefrom, the centrally disposed rear enclosure 7 is simply removed (as depicted in FIG. 2), the fifth-wheel post pin unhitched therefrom, the end gate H lowered and the vehicle P driven forward so as to clear the fifth-wheel trailer hitching post B from the cargo hold C and the port panel section 3 and centrally disposed entryway section 7 thereafter reassembled onto undercarriage 20 so as to provide a completely enclosed protective top covering 2 as depicted in FIG. 3. This effectively serves to protectively enclose the cargo hold from the elements and conceals the generally unattractive fifth-wheel mount A from view.

As may be observed from the Figures, the rear entryway accessing panel section 7 advantageously sealingly abuts onto the left rear 5 and right rear 6 sections or is secured in such a manner to allow for its separate removal from attachment 1. This facilitates the disassembly and assembly of the accessing panel sections (i.e 7 and 3) and ease in mounting and dismounting of the fifth-wheel hitching post B therefrom. The fully assembled protective top covering 2 as illustrated in FIG. 3 or when only the port panel section 3 removed therefrom for trailering fifth-wheelers enhances gas mileage and reduce wind drag.

Figure 5:
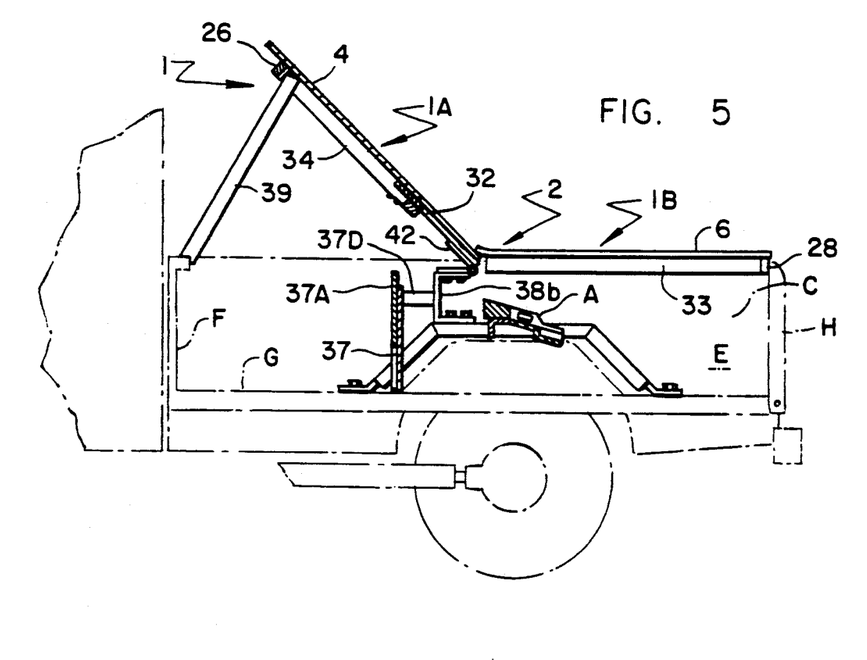
FIG. 5 is the same view of the attachment as shown in FIG. 4 except for its showing of the front panel segment of the attachment positioned in the raised position for accessing onto the front cargo hold portion of the cargo bed.
Figure 6:
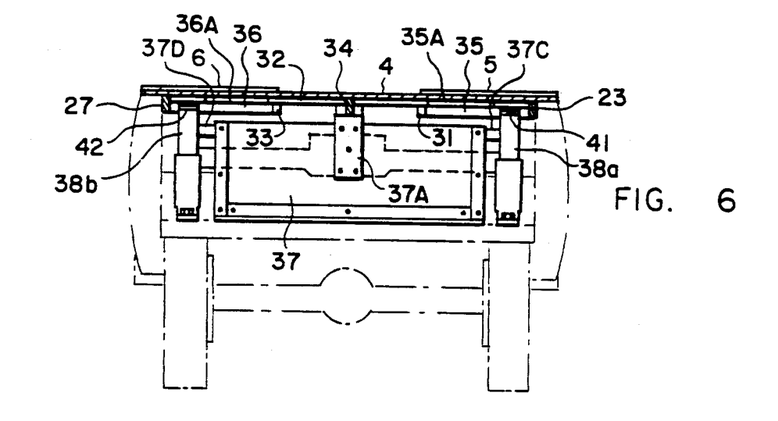
FIG. 6 is a cross-sectional view taken along line 6—6 of FIG. 4.

FIG. 5 reveals a further preferred embodiment of the invention in which at least one of the panel sections (shown as forward panel section 4) of the top covering 2 borders onto one or more of the vertical extending sidewalls (D, E and F) of the cargo hold C and is equipped with hinged accessing means (described later in greater detail) for accessing to the cargo hold C without requiring any detachment of the panel sections from protective covering 2. In the particular embodiment depicted in FIG. 5 (also shown in FIGS. 4, 6 and 8), the rearward margin of the front panel section 4 is fitted with a hinge assembly which includes left hinge 41 and right hinge 42 aligned so as to hinge forward panel section 4 along the bisecting intersect of the access port 3A. Hinges 41 and 42 are secured to the rearward and underside margins of front panel section 4 and onto spacers 38a and 38b (as will be described in greater detail later) so as to afford access to the forward cargo hold without necessitating removal or detachment of the front panel section 4 from attachment 1.

The panel sections 3–7 may be appropriately fabricated from substantially rigid materials of a sufficient structural strength and resistance against inclimate environments to protectively house the cargo hold C from environmental adversities such as wind, sunlight, rain, snow, etc. The panel sections 3–7 are advantageously constructed of materials characterized as possessing sufficient rigidity to resist substantial topographical deformation when exposed to vehicular generated wind currents. Illustrative materials for fabricating the panel sections 3–7 include molded thermoplastics and thermosets, wood and wood composites, metal sheeting and panels (e.g. aluminum, stainless steel, metal alloys, composites, etc.) and the like. Preferably the panel sections, individually, collectively, or in conjunction with a supportive undercarriage frame 20 afford a top covering 2 possessing sufficient structural strength and rigidity to protect the cargo hold C without any substantial deformation or topographical surface depression of the top covering panel sections 3–7 when trailering the trailer T therewith. The undercarriage frame 20 maintains panel sections 3–7 in a proper horizontal alignment and alleviates sagging, or an undesirable substantial concavular depression within the top covering surface 2. This in turn enhances the run-off of rain and other air borne materials throughout the entire top surface area.

In the preferred embodiments as shown in greater detail in FIGS. 4–8, the panel sections 3–7 are structurally supported in a fixed and immobilized position onto the cargo bed and by an undercarriage frame 20 which relies upon the cargo bed top rails (namely the left D, right E, forward F sidewalls and the raised tailgate H top rails), the outer peripheral margins of the panel sections (i.e 4–7 panel sections), the centrally disposed hitching mount A and the cargo bed as a supportive base for securing the attachment 1 onto the pick-up cargo hold C.

The undercarriage structure 20 is comprised of an external framework which includes a plurality of outer peripheral framing units (23–29) of a size and arrangement so as to fittingly abut onto the inner and upper portion of the cargo bed sidewalls (D–F) and the end gate H and inwardly disposed external framing units (designated as 31–33) which create a slotted entryway 7A or passageway extending onto accessing aperture 3A, and a plurality of internal framing chords (designated as 34, 35 and 36) internally disposed within external framework of undercarriage 20. The outer periphery of units 23–29 are sufficiently recessed inwardly from the outer edges of the panel sections 4–7 so as to abuttingly rest against the inner sidewalls (D, E and F) and end gate G and to allow for the overhanging margins of the panel sections 4–7 to rest upon the top rails of bed sidewalls D-F and tailgate G. The depicted peripheral supportive frame 20 relies upon the combination of an overhang margin of the panel section (the underside of which flushly rests upon cargo bed sidewall and tailgate top rails) and the rectangular shape of the periphery framing units which abuttingly mate onto the cargo bed top rails (i.e. forward, left, right and tailgate top rails) to laterally support and maintain the device in the appropriate protective covering position.

The slotted entryway framing units 31, 32 and 33 margin onto the port panel section 3 and the access entryway panel section 7 and form a slotted aperture or channel which extends inwardly from the central portion of the tailgate H onto the post port aperture 3A so as to provide an open channel (3A and 7A) for hitching and unhitching the post B from mount A. As will accordingly be observed from FIGS. 2, 7 and 8, the centrally disposed and rearward portions between the hitching mount to the tailgate as defined by external framework undercarriage 20 remain essentially free from undercarriage framing units which would impede the accessibility of the hitching post B to the hitch mount A. The depicted supportive undercarriage structure 20 also permits the end gate H to be lowered without obstruction while also affording an unimpeded access to the rearward portion of the cargo hold C and for the mounting and dismounting of the fifth-wheel trailer T therefrom.

In the preferred embodiments of the depicted invention, the frame 20 includes a plurality of periphery framing units (referenced as 23–29 in the drawings) of a size, configuration and arrangement so as to flushly abut onto the upper inner margins of the cargo bed sidewalls (D, E and F). The upper or top surface of the peripheral framing units 23–33 of the external framework are placed in a substantially horizontal and planar alignment to a horizontal plane which bridges across the upper top rail and end gate surfaces of the pick-up cargo hold C so as to support panels 3–7 in correspondent in a substantially flat alignment thereupon.

The preferred frame 20, as specifically shown in the Figures, includes a left forward sidewall framing unit 23 and a rear left sidewall framing unit 25 which abuttingly extend along the upper and inner margin of the left sidewall D top rail; a right forward sidewall framing unit 27 and a rear right framing unit 29 which correspondly abut onto the upper inner margin of the right sidewall E top rail, a front sidewall framing unit 26 which extends along the inner margin of the front sidewall F top rail and forms a connective structural bridge between the left forward 23 and right 27 forward sidewall framing units. The rearwardly disposed framing units 24 and 28 are respectively designed to abuttingly and perpendicularly extend from the upper cornering edge of the left sidewall D and right sidewall F and along the inner top rail wall of the tailgate H until they converge onto the slotted entryway 7A.

As will be explained later in greater detail, all of the adjacently positioned components of the undercarriage frame 20 of the preferred embodiments depicted in the Figures are rigidly secured together into two separate sections or segments 1A and 1B breaking width-wise across the cargo hold C to the abutting junctures of external framing units 23 and 25 and 27 and 29 on the opposite cargo hold side. This permits at least one of the segments (namely 1A or 1B) to be separately hinged for independent accessing to the cargo hold as depicted in FIG. 5.

The slotted entryway portion 7A of external frame includes a left passageway framing unit 31 and a right passageway unit 33 which respectively corner onto the rear left external framing unit 24 and the rear right external framing unit 28 and extend inwardly therefrom in a parallel relationship to one another until their respective joinder onto an oval cut framing unit 32 which connectively bridges between units 31 and 33 and defines the innermost margin of the slotted entryway 7A and 3A.

The left 31 and right 33 entryway undercarriage units are spaced apart at a sufficient lateral distance to allow for fifth-wheel post B accessing to mount A. The lateral positioning of members 31 and 33 provides support along the abutting longitudinal edges of panel sections 3, 5 and 6 and means for internally securing these panel sections thereto. The left entryway framing unit 31, the left rear framing unit 25 and the left tailgate unit 24 provide a supportive undercarriage for the left panel section 5 and the right side portion of access entryway panel section 7. The internal supportive undercarriage structure for the right panel section 6 and the access panel section 3 is substantially a mirror image thereto, with the right entryway framing unit 33, the right rear framing unit 29 and right tailgate unit 28 forming a supportive undercarriage for the right rear panel section 6 and the right longitudinal margin of entryway panel section 7.

The supportive undercarriage components may be appropriately constructed of material possessing sufficient rigidity (e.g. wood, metals, plastics, plywood, thermosets, etc.) to impart the required structural strength to the device.

The internal framing chords (34, 35, 35A, 36 and 36A) of the undercarriage assembly 20 are internally confined within undercarriage 20. Forward internal framing chord 34 forms a bisecting internal undercarriage supportive bridge between external front framing unit 26 and the external oval cut framing unit 32. Internal framing chords 35 and 36 are cornered respectively onto the forward frame edge of units 25 and 29 and respectively perpendicularly bridge onto the forward frame edges of framing units 31 and 33 to form a rectangularly-shaped undercarriage support structure therefore. The rearward portion of the forward part of the undercarriage 20 includes the internally disposed chords 35A and 36A which perpendicularly bridge between the rearwardmost edge of the front sidewall unit 23 and right front sidewall unit 27. Chords 35A and 36A respectively abut onto framing units 35 and 36 to provide a bridging undercarriage support for domed cut framing unit 32. If desired, chords 35A and 36A may be constructed of a single cross bracing piece integrating framing unit 32 into its structure. As may be partially observed from FIG. 8, corner braces 30A or other appropriate securing means such as screws may be used to secure the internal 22 and external framing units together into two separable segmented portions of a unitary construction.

The internally disposed framing chords (preferably 34–36) in cooperative association with external framing units 23–32 contribute towards the lateral and vertical support for the internally disposed portions of the panel sections 3–7. The internally disposed undercarriage units are referred herein as chords since (as mentioned above) the chords may be structurally integrated into the external framework.

The internal framing units 34–36 are structurally supported by the external frame structure, the overlapping portions of panel sections secured thereto, the cargo bed and the hitching mount A. The positioning of the external frame within and in an abutting relationship to sidewalls (D, E and F) and end gate H supports and stabilizes attachment against lateral movement within the cargo hold C.

Figure 8:
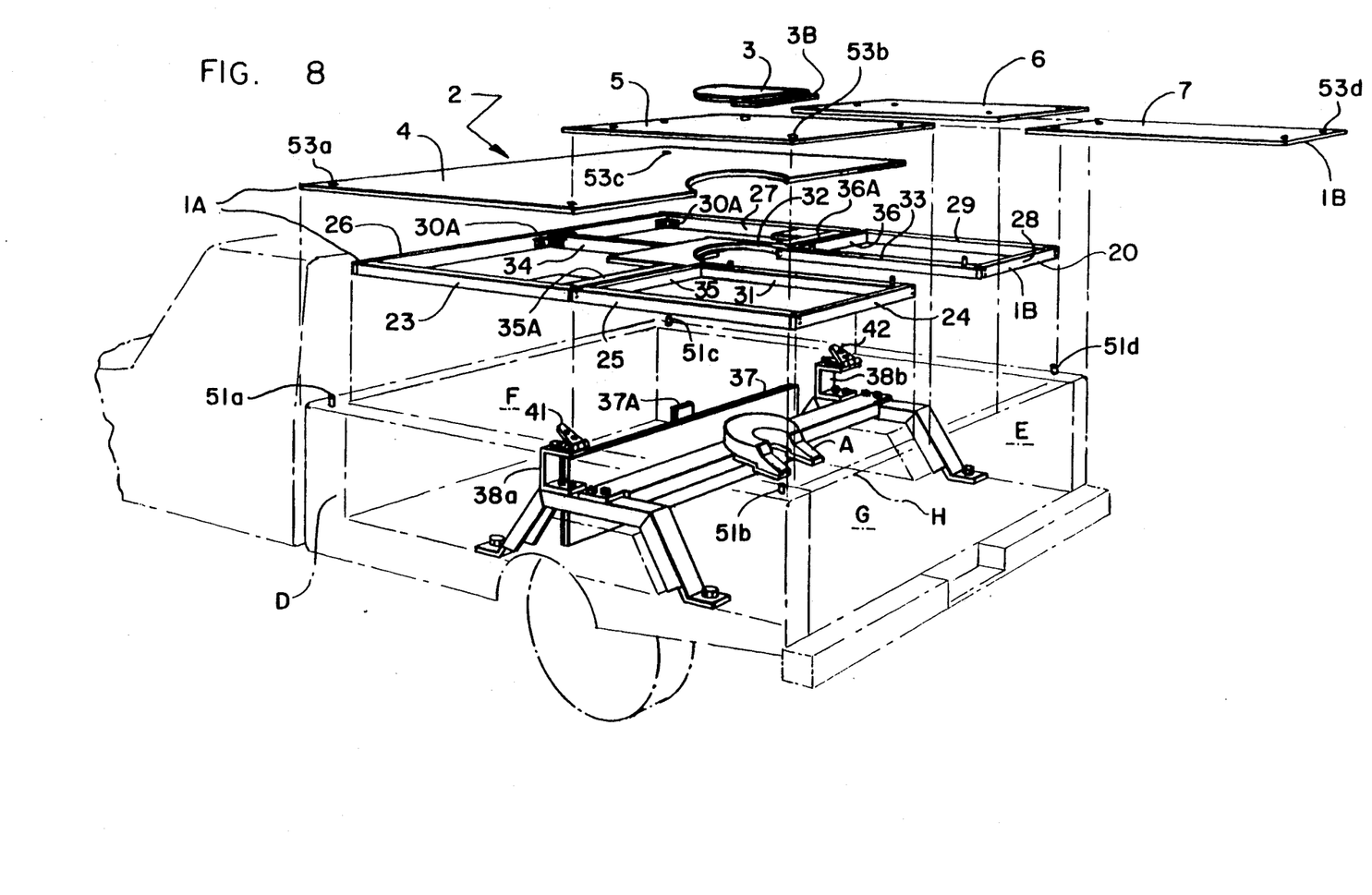
FIG. 8 is an exploded and break-away view of the components of the attachment which further illustrates the mounting relationship thereof for mounting onto a pick-up truck bed fitted with a fifth-wheel trailer hitch.

By referring particularly to FIG. 8, it will be observed that the left and right lateral framing chords 35A and 36B form an interconnective bridging network in conjunction with external units 25, 27 and 32 to support forward panel section 4 as an integral unit. External unit 32 includes a dome-shaped cut which protrudes rearwardly in relationship to the dome-cut size of forward panel section 4 (e.g. see FIG. 4) to provide a supportive ledge 32a (e.g. see FIG. 2) upon which the dome-shaped portion of panel section 3 rests within substantial horizontal alignment to the adjacent panel section surfaces thereto.

An internal dividing component 37 transversely bridges across the cargo bed G at a position forward from access port 2A. Component 37 forms compartment or cargo hold divider and a centrally disposed weight-bearing support for attachment segment 1A. The vertical edges of divider 37 are depicted as being nestled tightly against the wheel well sidewall surfaces. A pair of divider support braces 37C and 37D respectively secured onto the upper left margin and upper right of divider 37 and spacers 38a and 38b maintain and anchor divider 37 in the appropriate upright and vertical supportive position. The lower edge of divider 37 horizontally rests upon cargo bed G and may extend vertically upwardly with the upper edge so as to rest in horizontal alignment with the bed sidewall top rail surface (not shown) to form an interfacing contacting surface for the forward panel section 4. Divider 37 serves as supportive brace for the front panel section 4. A weather stripping seal (not shown) placed upon vertical edges, the bed G and bed wheel wells interface thereto may be utilized to effectively form a substantially water-tight compartment between the forward and rearward portions of cargo hold C. Divider 37 may serve as a weight-bearing wall which in cooperative conjunction with tap 37A (which supports chord 34), the forward panel section 4 and the forward framing units (23, 26 and 27) to maintain it in a substantially lateral and parallel relationship to the cargo bed G.

With particular reference to the preferred embodiments shown in more detail by FIGS. 4–6 and 8, the fifth-wheel hitch frame about the rear wheel wells in conjunction with a pair of U-shaped spacers 38a, and 38b sites further contribute to the structural support of forward attachment 1A. The height of U-shaped spacers 38a and 38b are respectively depicted as being secured (e.g. such as bolting) onto the top surfaces of the left and right hitch lateral support braces. The height of the wheel wells and hitch mounts may vary amongst the various pick-up cargo holds C and hitch mount styles. The height and placement of spacers (38a and 38b) may be accordingly adjusted to accommodate for these hitching mount brace and wheel well style differences. As illustrated, hinges 41 and 42 are respectively secured onto the top side of spacers 38a and 38b for corresponding attachment onto the rearward portion of forward panel section 4. Hinges 41 and 42 allow forward segment 1A to be raised for accessing onto the forward portion of the cargo hold C while the rearward attachment section 1B remains at its protective covering position as shown in FIG. 5. Prop 39 (as illustrated in FIG. 5) pivotally mounted onto internal chord 34 serves to supportively brace hinged forward segment 1A in an open position.

The attachment 1 further includes anchoring means (generally prefixed by 50 series numbering) for anchoring attachment 1 onto cargo hold C. This may be accomplished by any suitable anchoring means such as fitting the cargo bed stake pockets with stake pocket expanders (rubber) or adapters equipped with stake bolts 51a, 51b, 51c and 51d projecting therefrom which bear correspondent registration to bolt holes (53a, 53b, 53c and 53d) drilled through the overlapping cornering margins of panel sections 4, 5 and 6. Wing nuts 52a, 52b, 52c and 52d may be conveniently used to tighten and secure the front 4, left 5 and rear 6 panel section corners onto bolts 51a, 51b, 51c and 51d. Tightening of the stake pocket fitting causes the rubber expanders to expand and firmly anchor the panel sections 4, 5 and 6 onto the stake pockets.

The attachment 1 includes means (generally prefixed by 40) for attaching and detaching panel sections 3 and 7 so as to thereby permit the port panel section 3 and the rear accessory panel section 7 to be separately attached and detached therefrom. A wing nutted anchor bolt 40a secured onto ledge 32a provides a means for securing post section 3 onto the undercarriage structure 22. Wing nuts and bolts 40b, 40c, 40d and 40e (as shown in FIGS. 3 and 8) secure onto undercarriage units 31 and 32. Retaining plate 3B affixed onto the rearward and underneath margin of port panel section 3 serves to retain the rearward margin of panel 3 onto accessing panel 7. The forward margins of panel sections 5 and 6 are respectively secured onto internal framing units 36 and 35 by wing nuts and bolts 40g and 40f while the forward cornering margins of panels 5 and 6 are respectively detachably secured to unit 25 and 29 via wing nuts and bolts 40i and 40h. Other securing means such as groove and tongue combinations, interlocking panel sections, spring biased fasteners, dead bolt locking combinations, hinged panel sections equipped with latches, etc. may alternatively serve to secure the panel sections onto the undercarriage 20.

Weather stripping materials (e.g. such as resilient rubber or plastic materials) are preferably interdisposed between the interfacing surfaces of the undercarriage framing units and the panel sections as well as those portions of attachment 1 directly interfacing onto cargo hold C. A rubber stripping material adhesively affixed onto the lower surface for the panel sections may advantageously be used for this purpose. Such weather stripping may also be applied to the overlapping panel margin at the abutting juncture between panel sections 3–7. It is also preferable to emplace a resilient weather stripping material at the contacting interface of top rail surfaces of sidewalls (D, E and F) and end gate H.

For illustrative purposes, the top panel sections may be appropriately constructed of 3/16 inch thick masonite board stock sized to fit a standard sized pick-up truck equipped with a cargo bed measuring about 96×71 inches in which sidewalls (D–F) include a 2 inch inwardly projecting flange that forms the bed top rail. The rectangular forward panel section 4 may be fabricated from a sheet measuring 48"×71 ¼". The dome-shaped access portion 3A (for abutment onto post panel section 3) may be provided by cutting a 10 ½" radius semi-circular using the bisecting intercept of mid-point of one of the crosscut edges (i.e. 35⅝") of the front panel sections as the radial center point. The dome-shaped access post panel section 3 may be fabricated from a rectangular sheet stock piece measuring 17½" by 21" in which the aforementioned dome-shaped cut-out from the forward panel section 4 was used as a template therefore. The rectangular left 5 and right 6 panel sections (each measuring 25" by 51¼") and the rear access panel sections (measuring 45½"×21¼") may likewise be fabricated from the sheet stock.

Framing unit 32 which forms the undercarriage 20 closure for the slotted entryway portion of external framework may be fabricated from the below listed plywood stock by making an 8½" radius semi-circular cut along the bisect of one of its longitudinal edges to provide a 2" protruding lip 32a for support of post panel section 3. Except as indicated below, fir lumber stock of the following dimensions may be used to fabricate the undercarriage assembly:

| Component | Dimensions | Framing Position |
|---|---|---|
| Right forward framing unit 27 | 42" × 1½" × 1" | 1 |
| Left forward framing unit 23 | 42" × 1½" × 1" | 1 |
| Front framing unit 26 | 64¼" × 1½" × 1" | 1 |
| Rear left sidewall framing unit 25 | 47½" × 1½" × 1" | 1 |
| Rear right sidewall framing unit 29 | 47½" × 1½" × 1" | 1 |
| Front internal framing unit 34 | 33" × 1½" × 1" | 1 |
| Left tailgate framing unit 24 | 21¼" × 2" × 1" | 2 |
| Right tailgate framing unit 28 | 21¼" × 2" × 1" | 2 |
| Internal tailgate framing unit (optional) | 19¼" × 2" × 1" | 2 |
| Framing unit 32 (plywood) | 12" × 32" × ½" | 2 |
| Divider 27 (plywood) | 50¼" × 16" × 1" | 1 |
| Left entryway unit 31 | 45½" × 1½" × 1" | 1 |
| Right entryway unit 33 | 45½" × 1½" × 1" | 1 |
| Forward dividing unit 34 | 33" × 1½" × 1" | 1 |
| Left Chord 35 | 19¼" × 1½" × 1" | 2 |
| Right Chord 36 | 19¼" × 1½" × 1" | 2 |
| Left Chord 35A | 16½" × 1½" × 1" | 1 |
| Right Chord 36A | 16½" × 1½" × 1" | 1 |

In assembling the periphery units and internal members together as depicted, the above components designated by a "1" may be placed with the narrowest edges resting in a vertical projecting position, while those designated by "2" were positioned within the undercarriage structure so the narrowest edges rested in a horizontal position. The front framing unit 26 may be squared within the forward edges of the right forward framing unit 27 and the left forward framing unit 23, and secured thereto with a cornering brace 30A. The left tailgate unit 24 and the right tailgate unit 28 were likewise cornered and secured with cornering braces 30A onto rear left framing unit 25 and rear right framing unit 29. The left entryway unit 31 and the right entryway 33 were respectively cornered at right angles and secured by cornering braces 30A onto the crosscuts of the left tailgate unit 24 and the right tailgate unit 28.

Rubber stripping (⅛" thick and 1" wide) was affixed (cemented) onto the bottom surface and along the entire overlapping peripheral margin of the access port panel sections, the foremost overlapping margin of the left 6 and right 5 rear panel sections and the overlapping lengthwise margin of access entryway panel section 7. Thus, each portion of the overlapping panel sections were provided with an intervening sealing layer therebetween.

Two 3/16" angle irons with one inch lips and 6 inches in length were bolted onto the opposite ends of the divider 37 (1" removed from top edge with 1½" horizontal projection therefrom) so as to respectively corner and mate onto the underside of right forward framing unit 23 and the left forward framing member 27 were secured to divider 37. The planar upper surface of forward dividing undercarriage unit 34 was then respectively centered flushly onto the longitudinal bisect of the front framing unit 26 and the upper edge of divider 37 and secured onto unit 26. The forward carriage divider unit 34 recessed cut (½") at its interfacing top surface to external unit 32 so as to permit the upper surface of unit 32 to rest in horizontal alignment with the other external 21 framing units upper surface and thereby provide a flat surface to secure panel section 4 thereto. Cornering braces 30A on each may be used to secure the forward portion thereof to front sidewall unit 26 and screws, cement, etc. for securing the rearward interfacing recessed cut onto unit 32. The left and right side portions of unit 32 may likewise be secured onto chords 35A and 36A.

Four ⅜" diameter drill holes 53a, 53b, 53c and 53d onto the bolts of the stake pockets expander bolts 51a, 51b, 51c and 51d may be made at each of the corresponding corners of panel sections 4, 5 and 6. A 1/16" thick and 4" wide an 20" long steel plate was centered (opposite to the domed portion) onto the access port panel section 3 so as to provide about a 2" overhang secured thereto by 4¼" wing nuts and bolts. To the rear margins of the port access panel 3, framing unit 7c was secured thereto. Hinge block spacers 38a and 38b are shown (e.g. see FIGS. 5 and 8) as respectively cornering onto chord 35 and unit 23 and chord 36 and unit 27 which spacers serve as hinging sites for mounting hinges 41 and 42 thereto. Hinges 41 and 42 were positionally secured onto spacers 38a and 38b. If desired, divider 37 may be reinforced with firring strips abuttingly placed along the bottom and side margins of divider 37.

With particular reference to FIGS. 5 and 8, it may also be observed that the forward and rearward portions of the attachment 1 are of split design and construction which permits the forward portion 1A of the top covering 2 (namely forward panel section 4) and the correspondent forward undercarriage 20 components (namely chords 35a and 36b, and 34 and peripheral units 23, 26, 27 and 32) to be respectively raised for bed accessing as illustrated in FIG. 5 when port panel section 3 has been detached therefrom without disturbing the rearward portion 1B of the undercarriage 20 and panel sections (namely 5–7). The hinging mechanism and splitting of the sidewall framing units (namely 23, 25, 27 and 29) into a forward and rearward unit permit the forward portion of the attachment to be separately and independently hinged thereto.

What is claimed:

1. A cargo bed attachment for use in covering a cargo hold of a transporting vehicle equipped with a cargo bed having vertically extending sidewalls and an end gate for accessing onto said bed, and a fifth-wheel hitching mount for hitching a fifth-wheel hitching post thereto, said attachment comprising:

A) a plurality of adjacently positioned and segmented covering panel sections of a size and arrangement so as to protectively cover said hold and to peripherally overlap onto said sidewalls and said end gate, with said panels including:

i) a removable port panel section which protectively covers a ported aperture of a sufficient size about the hitching mount to permit maneuverability of the hitching post therewithin while trailering a fifth-wheel trailer therewith, and ii) a removable rearward panel section protectively covering a slotted passageway extending from said ported aperture onto said end gate;

B) an undercarriage frame which supportively engages onto said panels and provides detachable mounting sites for securing said panels together in an abutting protective relationship upon said frame, with said frame comprising:

i) an external framework defining a peripheral configuration bordering onto said sidewalls and said end gate, with said framework including a slotted framing entryway portion margining onto said ported aperture and said passageway so as to permit access of the hitching post to the hitching mount upon removal of said rearward panel section and said port panel section from said frame, and ii) an internal framing chord structure interconnectively bridging segmented regions within said framework so as to supportively brace said framework and provide internal mounting sites for mounting said panels onto said frame;

C) securing means for attaching and detaching the panels from said frame so as to permit the port panel section and the rearward panel section to be separately attached and detached from said frame; and D) anchoring means for anchoring the attachment onto the cargo hold.

2. A cargo bed attachment for use in covering a cargo hold of a transporting vehicle equipped with a cargo bed having vertically extending sidewalls and an end gate for accessing onto said bed, and a fifth-wheel hitching mount for hitching a fifth-wheel hitching post thereto, said attachment comprising:

A) A plurality of adjacently positioned and segmented covering panel sections of a size and arrangement so as to protectively cover said hold and to peripherally overlap onto said sidewalls and said end gate, with said panels including:

i) a removable port panel section which protectively covers a ported aperture of a sufficient size about the hitching mount to permit maneuverability of the hitching post therewithin while trailering a fifth-wheel trailer therewith, and ii) a removable rearward panel section protectively covering a slotted passageway extending from said ported aperture onto said end gate;

B) an undercarriage frame which supportively engages onto said panels and provides detachable mounting sites for securing said panels together in an abutting protective relationship upon said frame, with said frame comprising:

i) an external framework defining a peripheral configuration bordering onto said sidewalls and said end gate, with said framework including a slotted framing entryway portion margining onto said ported aperture and said passageway so as to permit access of the hitching post to the hitching mount upon removal of said rearward panel section and said port panel section from said frame, and ii) an internal framing chord structure interconnectively bridging segmented regions within said framework so as to supportively brace said framework and provide internal mounting sites for mounting said panels onto said frame, with said undercarriage frame including a forward undercarriage frame segment and a rearward frame segment abutting onto said forward frame segment and the forward segment includes a hinge assembly so as to enable the forward segment to be independently hinged from the rearward segment about said hinge assembly and thereby affording access onto the cargo hold;

C) securing means for attaching and detaching the panels from said frame so as to permit the port panel section and the rearward panel section to be separately attached and detached from said frame; and D) anchoring means for anchoring the attachment onto the cargo hold.

3. The attachment according to claim 1 wherein the attachment includes a divider to supportively brace said frame against bed, with said divider being positioned at a dividing position forward from said hitching mount so as to divide the cargo hold into a forward compartment and a rearward compartment.

4. The attachment according to claim 1 wherein the internal framing structure interconnectively bridges across the framework at a centrally disposed region margining about said ported aperture.

5. The attachment according to claim 4 wherein the internal framing structure includes a forward chord interconnectively bridging between a forwardly disposed portion of said external frame and a region of said external framework margining about said ported aperture.

6. The attachment according to claim 1 wherein the undercarriage includes a forward undercarriage frame segment and a rearward frame segment abutting onto said forward frame segment.

7. The attachment according to claim 6 wherein the forward segment includes a hinge assembly so as to enable the forward segment to be independently hinged from the rearward segment about said hinge assembly and thereby affording access onto the cargo hold.

8. The attachment according to claim 2 wherein the port panel section is collectively supported by said forward segment and said rearward segment.

9. The attachment according to claim 2 wherein the covering panel sections include at least one forward panel section secured onto said front segment.

10. The attachment according to claim 2 wherein the rearward frame segment abuttingly aligns onto said forward frame segment along a plane traversing the ported aperture of said attachment.

11. The attachment according to claim 10 wherein the forward segment includes a forward panel section which is detachably secured onto said forward frame segment.

12. The attachment according to claim 11 wherein the rearward frame segment, in addition to the rearward panel section, includes at least two other panel sections detachably mounted onto said rearward frame segment and aligned upon said rearward frame segment in a laterally disposed and abutting relationship to said rearward panel section.

13. The attachment according to claim 12 wherein the port panel section bridges onto said rearward frame segment and said forward frame segment.

14. The attachment according to claim 13 wherein the panel sections consist essentially of the forward panel section, the port panel section, the rearward panel section, a left rear panel section, and a right rear panel section, and the forward panel segment is supportively braced by a supportive dividing brace which divides the cargo hold into a forward cargo hold compartment and a rearward cargo hold compartment.

* * * * *